United States Patent [19]
Roehrig

[11] 3,983,845
[45] Oct. 5, 1976

[54] RESTRAINER FOR DOGS
[76] Inventor: John A. Roehrig, 125 St. Andrews Circle, McKeesport, Pa. 15135
[22] Filed: Oct. 6, 1975
[21] Appl. No.: 619,783

Related U.S. Application Data
[63] Continuation of Ser. No. 518,452, Oct. 29, 1974, abandoned.

[52] U.S. Cl. .............................................. 119/120
[51] Int. Cl.² ........................................... A01K 3/00
[58] Field of Search ........................... 119/120, 121

[56] References Cited
UNITED STATES PATENTS
3,189,003  6/1965  Canfield ............................. 119/120
3,203,399  8/1965  Banks ................................. 119/120

Primary Examiner—Hugh R. Chamblee
Attorney, Agent, or Firm—William J. Ruano

[57] ABSTRACT

A restraining device for dogs or other animals comprising a track or strip of plastic which extends on the ground surface and has a slide which slides along the track as a carriage. The dog's collar is tied to the slide, thereby restraining it to a predetermined distance from the track.

1 Claim, 6 Drawing Figures

RESTRAINER FOR DOGS

This is a continuation of application Ser. No. 518,452 filed Oct. 29, 1974 and now abandoned.

This invention relates to a restraining device for dogs or other animals so as to keep the dog within the confines of a particular area.

An outstanding disadvantage of conventionally used devices for restraining dogs is that they are either too confining or too unsightly. For example, dogs may be tied to a post with a long line to provide a certain freedom, however the dog usually encircles the post several times and is tangled in the line and greatly confined. A dog may also be tied to a clothes line, however this is unsightly, limited in length and therefore limited in protection against trespassers, therefore is not a practical solution to the problem.

An object of my invention is to provide a novel restraining device for dogs or other animals which overcomes the abovenamed disadvantages of conventionally used devices and is arranged so that the dog, while restrained, has a higher degree of freedom than heretofore possible.

Another object of the present invention is to provide a restraining device for dogs, which device is practically invisible, therefore avoiding the unsightliness of previously used restraining devices.

Still another object of the present invention is to provide a restraining track having a carriage or slide slidably mounted thereon and to which the dog is tied to which enables a very long length of flexible track to be used, such as one which completely surrounds a house to give ample freedom and exercise to the dog, without danger of entanglement, and still confining the dog to the property of the owner in the immediate vicinity of the house to provide maximum protection against trespassers and so as not to violate local laws against running dogs.

Other objects and advantages will become more apparent from a study of the following description, taken with the accompanying drawings wherein.

Figure 1:
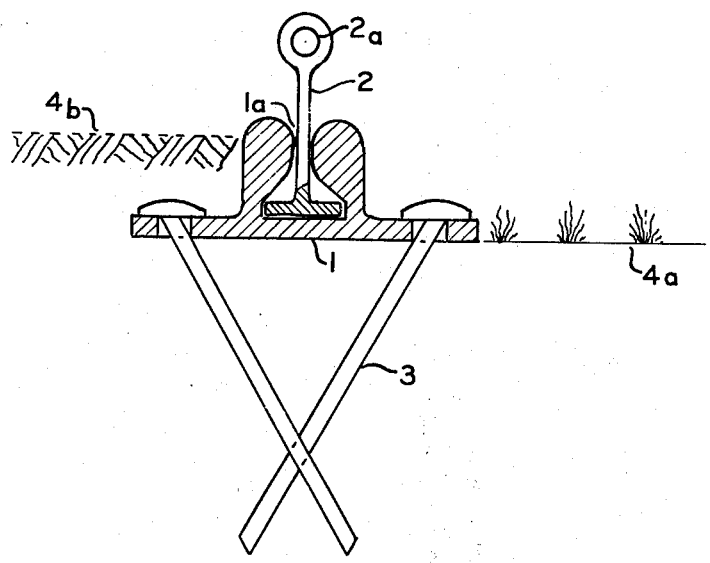
FIG. 1 is a cross-sectional view of a track and slide embodying the principles of the present invention.

Referring more particularly to FIG. 1 of the drawing, numeral 1 generally denotes a transverse, cross-sectional view of an elongated strip of light metal, such as aluminum, or of plastic material, such as polyethylene or nylon which makes the track bendable laterally. The track or strip may be several inches long and has holes extending at spaced distances along its length through which anchoring means, such as long spikes or studs 3 are driven, preferably crossing each other, as shown in FIG. 1. The track, particularly if made of metal, may be notched at intervals along its sides to make it more flexible when bending the track laterally. Such notches would also facilitate cutting of the strip to the desired length.

The strip 1 may be either supported on the surface of the ground, as denoted by numeral 4a, or may be buried in a small trench beneath the surface of the ground, as denoted by numeral 4b. Slid onto the end of the track or strip 1 is a slide or carriage 2 which has a shank portion which extends through an opening 1a between two bulbous portions of the slide, whereby lifting of a horizontally extending flange portion at the base of the slide 2 is resisted by such bulbous portions.

The slide 2 terminates in a ring or eye portion 2a, to which the leash or chain, tied to the collar of the dog or other animal, is attached. It will be apparent that extremely long lengths of the strip 1 may be provided extending, for example, alongside the rear of a house, or perhaps in a rectangular pattern with rounded corners surrounding the entire house.

In operation, the dog merely pulls on the slide 2 in either direction longitudinally relative to the strip 1, which the dog can do freely because of the relatively low friction between the slide 2 and strip 1.

The extreme ends of the strip 1 are blocked by any suitable stop means. Thus the dog may be given an extremely long path of travel which provides not only more exercise and freedom but permits the dog to guard all nearby portions of the house against burglars, trepassers, etc.

Figure 2:
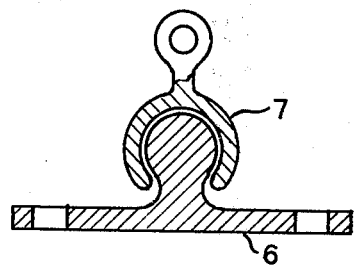
FIG. 2 is a cross-sectional view of a modification thereof.

FIG. 2 shows a modification wherein the strip 6 has a single bulbous portion which is surrounded by a slide 7 of somewhat circular corss-section and which has a top ring or eye portion to which a leash may be attached.

Figure 3:
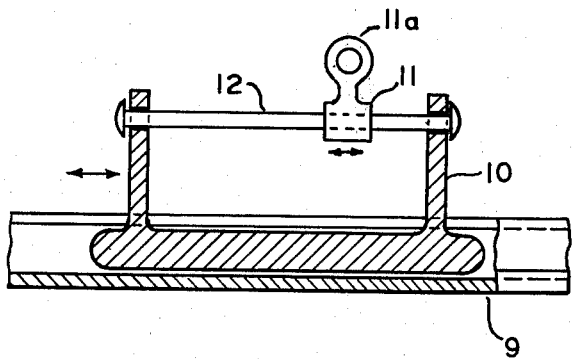
FIG. 3 is a further modification of the slide.

FIG. 3 shows a further modification of the track 9 which may be of the same cross-section as track 1 in FIG. 1 and along which the slide 10 slides longitudinally in either direction as shown by the arrows. The slide has two upright portions between which there is extended a rod 12 along which a secondary slide 11 may slide in either direction, as shown by the arrows and having a ring portion 11a to which the leash is attached. By such construction, there is less tendency for the slide to be tilted and locked by the dog in any given longitudinal portion of the strip.

Figure 4:
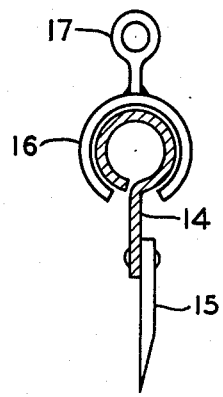
FIG. 4 is a cross-sectional view of a still further modification of the track and slide.

FIG. 4 shows another modification wherein the track has a cross-section somewhat like that of a piano hinge, as denoted by numeral 14, along which a slide 16 of substantially circular cross-section, is slid by pulling on the ring portion 17, which is moved by attachment to the leash of the dog. At spaced points, anchors or spike-like anchoring elements 15 are attached, having sharp bottom portions which may pierce the ground when a hammer is struck against the top portion of the track or strip 14.

Figure 5:
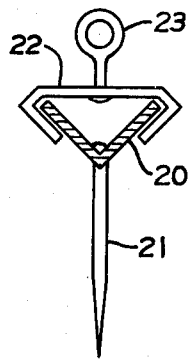
FIG. 5 is a cross-sectional view of yet another modification of the track and slide.

FIG. 5 is a still further modification wherein the track or strip 20 is in the form of an elongated angle iron of metal or plastic material having a plurality of spaced holes along the V or intersection thereof through which spikes 21 are driven into the ground at spaced points. The slide 22 has angularly downwardly disposed end portions which embrace the end extremity portions of the strip 20. By attachment of the leash to the ring or eye portion 23, the slide 22 is moved longitudinally of the track or strip 21 by the dog.

In any embodiment involving a plastic strip, a reinforcing cable (not shown) may be run through a longitudinal hole thereof, particularly the bulbous part of FIG. 2.

Figure 6:
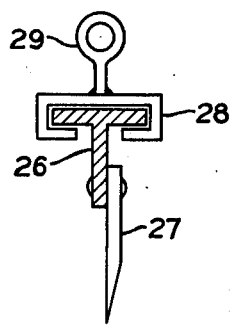
FIG. 6 is still another modification of the track and slide.

FIG. 6 shows even a further modification wherein the track or strip 26 is of T cross-section. At spaced points, anchors or spikes 23 are riveted or otherwise secured to the vertical portion of the strip 26 so that spikes 23 may be driven into the ground when striking the top of the strip 26 with a hammer. The slide 28 is of channel section and has a ring or eye portion 29 to which the dog's leash may be attached.

Thus it will be seen that I have provided a highly efficient, restrainer for a dog, cat or other animal, which restrainer is of very inexpensive and light-weight construction and lends itself to be planted in the ground so as to be completely out of sight when below the surface of the ground, so as not to interfere with grass mowing; also which may be laid in any suitable pattern, such as rectangularly around the house or along a U-shape etc.; also which may be cut easily and quickly in any length and which may be installed simply and quickly by any inexperienced person,- such restraining means providing maximum exercise and minimum restraint to the dog and yet confining the dog to the immediate vicinity of the house at all times to give maximum protection against trespassers.

While I have illustrated and described several embodiments of my invention it will be understood that these are by way of illustration only and that various changes and modifications may be contemplated in my invention and within the scope of the following claim.

I claim:

1. A tether device for restraining the running of a dog or other animal, comprising an elongated strip having a V-shaped cross-section provided with a plurality of longitudinally spaced holes at the intersection of the legs of the V-shape, spikes driven through said holes for anchoring the pointed end of said intersection of the V-shape into the ground, a slide having angularly downwardly and inwardly extending end portions parallel to and slideable along the outer surfaces of the extremity portions of said V-shape of the strip and an intermediate portion of said slide formal with said end portions, and a ring rigidly secured to and extending upwardly from the center of said slide, to which ring a leash of said intermediate portion of said animal may be attached.

* * * * *